United States Patent
Laughman

(10) Patent No.: US 10,014,081 B2
(45) Date of Patent: Jul. 3, 2018

(54) BLOCK-TYPE MOVABLE REFLECTOR/MODERATOR (RM) FOR NUCLEAR REACTOR CONTROL

(71) Applicant: Daniel Lee Laughman, Forest, VA (US)

(72) Inventor: Daniel Lee Laughman, Forest, VA (US)

( * ) Notice: Subject to any disclaimer, the term of this patent is extended or adjusted under 35 U.S.C. 154(b) by 214 days.

(21) Appl. No.: 14/929,376

(22) Filed: Nov. 1, 2015

(65) Prior Publication Data

US 2017/0162278 A1 Jun. 8, 2017

(51) Int. Cl.
*G21C 7/08* (2006.01)
*G21C 5/02* (2006.01)
*G21C 5/14* (2006.01)
*G21C 7/26* (2006.01)
*G21C 7/28* (2006.01)

(52) U.S. Cl.
CPC .......... *G21C 5/02* (2013.01); *G21C 5/14* (2013.01); *G21C 7/26* (2013.01); *G21C 7/28* (2013.01); *G21Y 2002/50* (2013.01); *G21Y 2004/40* (2013.01)

(58) Field of Classification Search
CPC ... G21C 7/08; G21C 7/28; G21C 5/02; G21C 5/14; G21C 7/26; G21Y 2004/40; G21Y 2002/50; Y02E 30/34; Y02E 30/39; Y02E 30/40
See application file for complete search history.

(56) References Cited

U.S. PATENT DOCUMENTS

| | | | | |
|---|---|---|---|---|
| 3,041,263 A | * | 6/1962 | King | G21C 1/02 376/172 |
| 3,165,447 A | * | 1/1965 | Stephenson | G21C 1/30 376/219 |
| 3,238,107 A | * | 3/1966 | Leyse | G21C 1/30 376/221 |
| 3,287,225 A | * | 11/1966 | Tunstall Ackroyd Ronald | G21C 7/28 376/220 |
| 3,827,225 A | * | 8/1974 | Schoerner | B65H 57/18 57/13 |

(Continued)

FOREIGN PATENT DOCUMENTS

| GB | 0878180 | * | 9/1961 | |
|---|---|---|---|---|
| GB | 878180 A | * | 9/1961 | G21C 1/02 |

OTHER PUBLICATIONS

B. Vrban, J. Lüley, Š. Čerba, J. Haščíc, Proposal of movable reflector for fast reactor design, Oct. 22, 2015, Institute of Nuclear and Physical Engineering, Technical Meeting on Passive Shutdown Systems for Liquid Metal Cooled Fast Reactors.*

(Continued)

*Primary Examiner* — Michael C Zarroli
(74) *Attorney, Agent, or Firm* — Dale Jensen, PLC; Dale Jensen

(57) ABSTRACT

A block-type movable reflector/moderator (RM) for nuclear reactor control is disclosed. This reactor control system can be applied to all types of reactors regardless of design. This design for reactor control is used in addition to the necessary rod control system in accordance with the 10CFR50 design criteria. This allows for the requirements of the NRC to be met along with the ability for dual control on power control of any type reactor regardless of process output from the secondary plants.

18 Claims, 5 Drawing Sheets

(56) References Cited

U.S. PATENT DOCUMENTS

| | | | | |
|---|---|---|---|---|
| 4,127,443 | A * | 11/1978 | Wetch | G21C 1/04 376/220 |
| 5,196,159 | A * | 3/1993 | Kawashima | G21C 1/02 376/221 |
| 5,420,897 | A * | 5/1995 | Kasai | G21C 1/02 376/220 |
| 8,126,105 | B2 * | 2/2012 | Yokoyama | G21C 7/28 376/219 |
| 8,295,425 | B2 * | 10/2012 | Sakai | G21C 1/02 376/219 |
| 9,093,182 | B2 * | 7/2015 | Inatomi | G21C 1/02 |
| 2013/0294563 | A1 * | 11/2013 | Nagata | G21C 1/022 376/220 |
| 2015/0117589 | A1 * | 4/2015 | Kamei | G21C 1/22 376/347 |

OTHER PUBLICATIONS

J Phelps, H Windsor, H Takahashi, J Conant, K Chnadramoleswar; Critical Experiments for the Brookhaven Pulsed Fast Reactor Study, 1972, Nuclear Science and Engineering, 49, 274-300.*

* cited by examiner

BLOCK-TYPE MOVABLE REFLECTOR/MODERATOR (RM) FOR NUCLEAR REACTOR CONTROL

BACKGROUND

Problem Solved

The Nuclear Regulatory Commission (NRC) has established design criteria as part of the cod of federal regulations (i.e. 10CFR50 appendix A). Design criterion #26 states: "Two independent reactivity control systems of different design principles shall be provided. One of the systems shall use control rods, preferably including a positive means for inserting the rods, and shall be capable of reliably controlling reactivity changes to assure that under conditions of normal operation, including anticipated operational occurrences, and with appropriate margin for malfunctions such as stuck rods, specified acceptable fuel design limits are not exceeded. The second reactivity control system shall be capable of reliably controlling the rate of reactivity changes resulting from planned, normal power changes (including xenon burnout) to assure acceptable fuel design limits are not exceeded. One of the systems shall be capable of holding the reactor core subcritical under cold conditions."

Previous designs all complied with the requirement to provide a rod control system. Boiling Water Reactor (BWR) used a separate reactor core flow control which effectively manipulated the moderator (i.e. coolant properties) through the core. Pressurized Water Reactor (PWR) designs used a mixture of boron within the primary coolant which also effected how the moderator could control the nuclear chain reactions within the core. Beyond these two types of manipulation of the water within the core of a reactor, there was no other way to sufficiently provide separate control through all the range of power levels expected by the NRC.

The only other moderator control systems are applicable to light water reactors by changing the properties of the water within the core (i.e. phase changes in a BWR and chemical addition in a PWR). Void content changes in the water of a BWR form a very rapid feedback loop for power ascension and reduction. The use of poison control for a PWR is a much slower process. This invention changes the physical geometry around the core and therefore can always be relied upon to perform its function.

This reactor control system can be applied to all types of reactors regardless of design. This design for reactor control is used in addition to the necessary rod control system in accordance with the 10CFR50 design criteria. This allows for the requirements of the NRC to be met along with the ability for dual control on power control of any type reactor regardless of process output from the secondary plants.

DETAILED DESCRIPTION

Itemized Parts List

Figure 1:
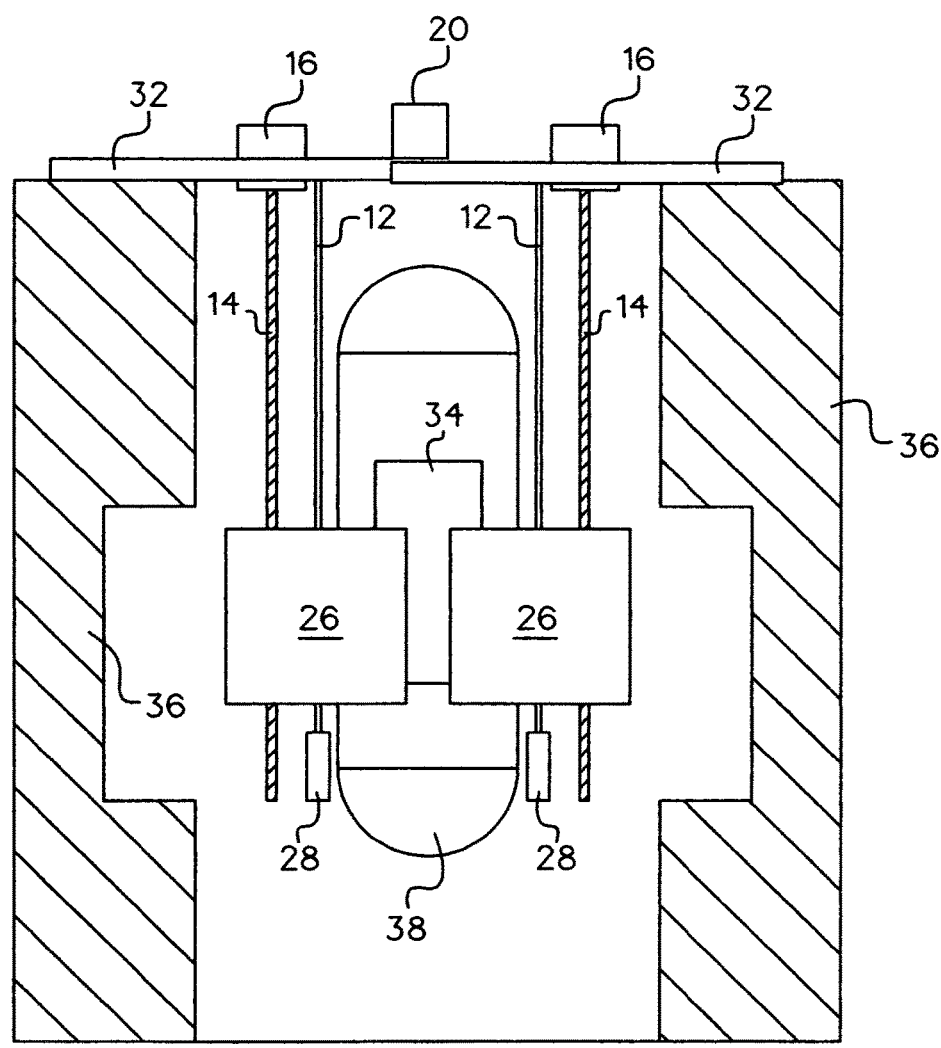
FIG. 1: is a schematic of the invention in a static position.
Figure 2:
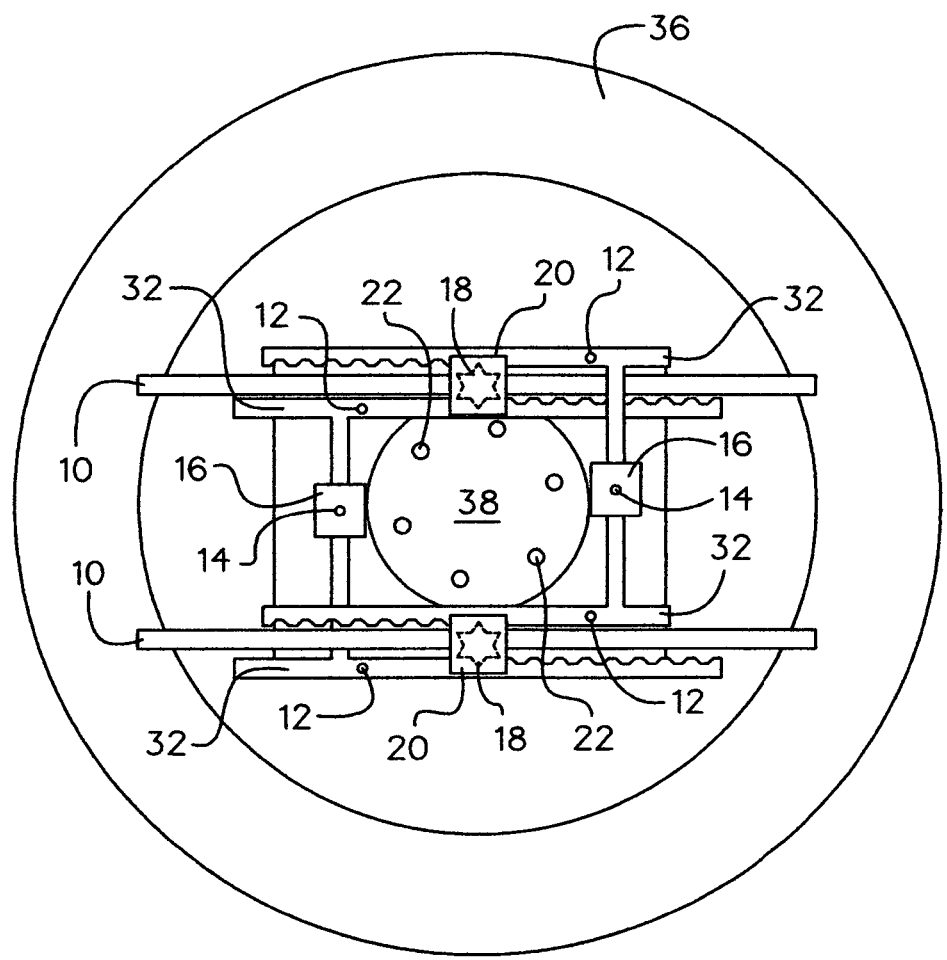
FIG. 2: is a schematic top view of the invention in a static position.
Figure 3:
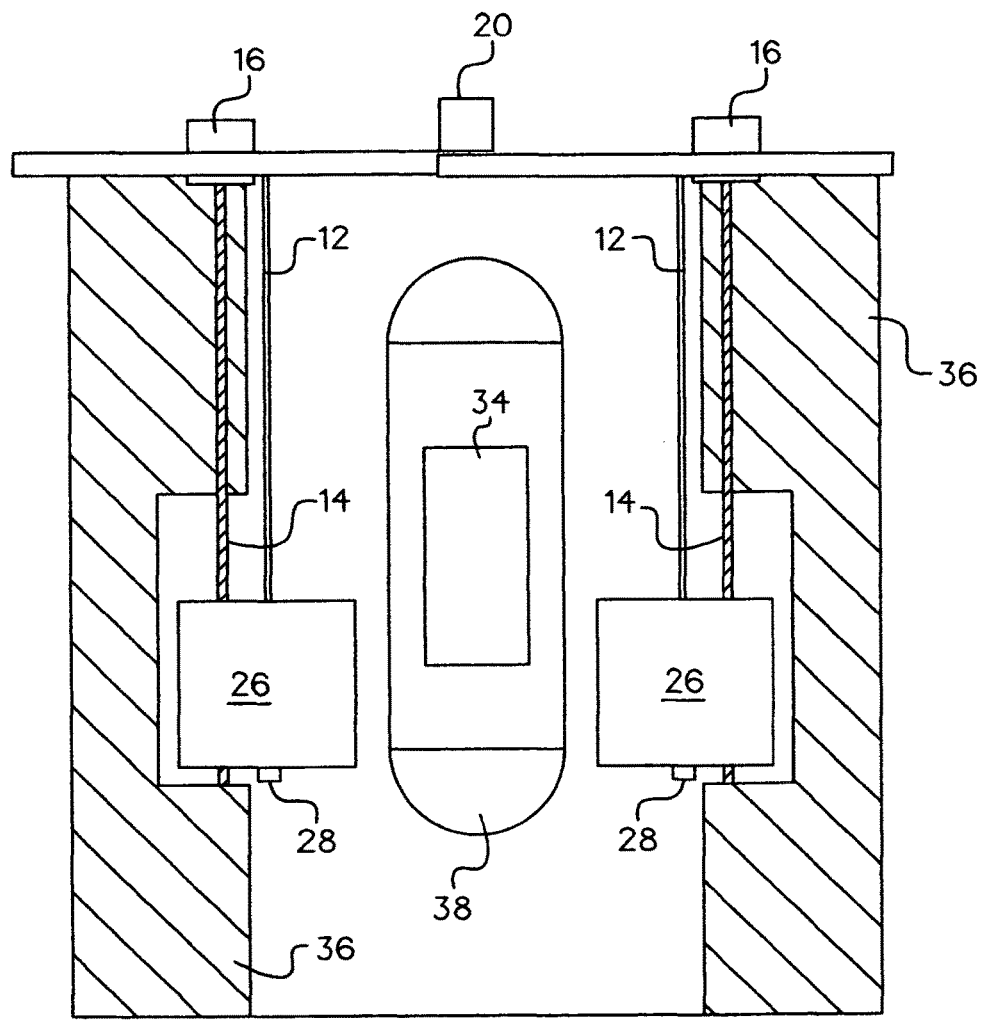
FIG. 3: is a schematic illustrating the reflector/moderator blocks 26 in an extended position and the suspension rod brace 28 compressed.
Figure 4:
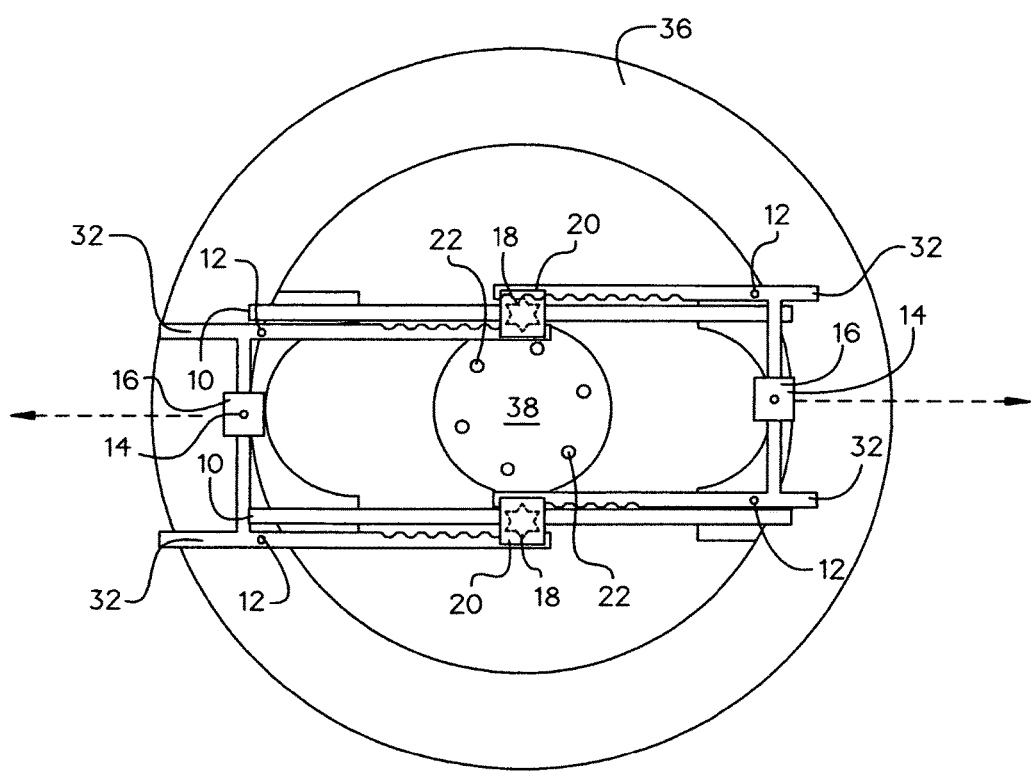
FIG. 4: is a schematic top view illustrating the reflector/moderator blocks 26 in an opened position.
Figure 5:
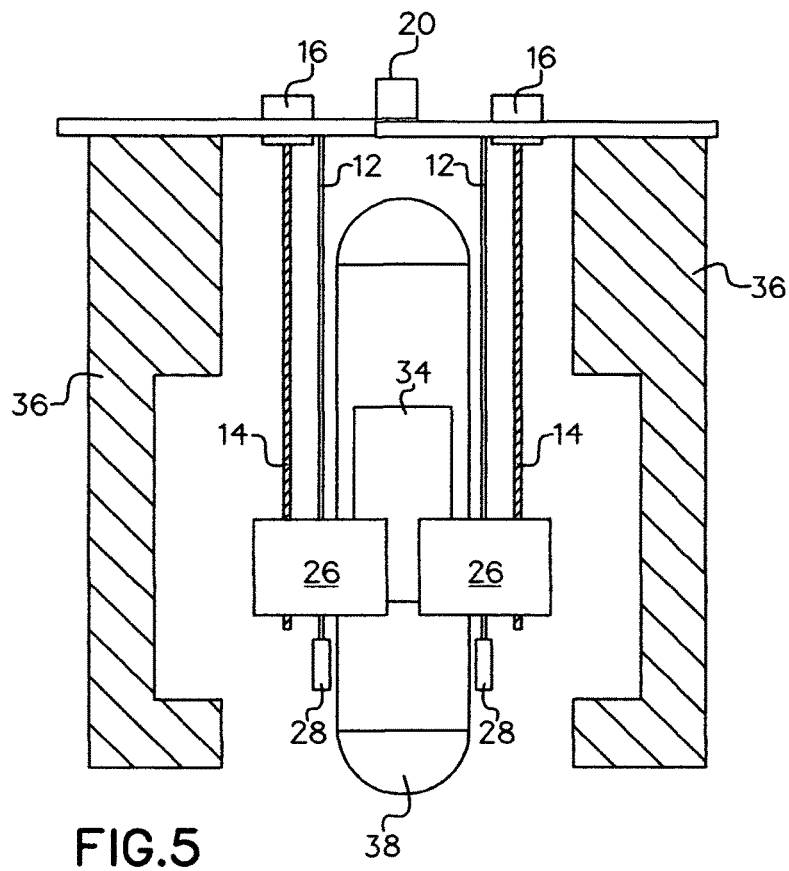
FIG. 5: is a schematic illustrating the reflector/moderator blocks 26 in a closed position.
Figure 6:
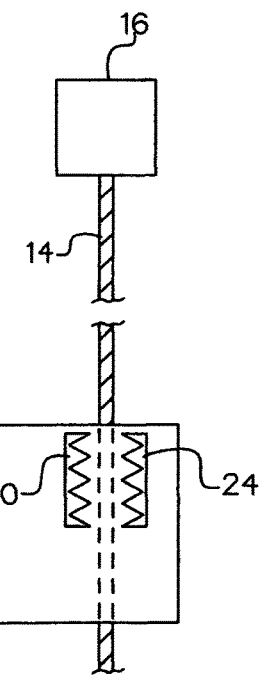
FIG. 6: is an enlarged view of the neutron reflector/moderator blocks 26.

10: is the carriage brace;
12: are the suspension rods;
14: is the vertical gearing rod;
16: is the vertical gearing rod motor;
18: is the center gearing;
20: is the carriage brace motor;
22: is the neutron detection system input (incore or excore detectors);
24: is the control logic for movement;
26: are the neutron reflector/moderator blocks;
28: is the suspension rod brace (to control downward movement of RM blocks;
30: is the release locks;
32: is the carriage;
34: is the reactor core;
36: is the reactor containment; and
38: is the reactor.

As stated above, The Nuclear Regulatory Commission (NRC) has established design criteria as part of the cod of federal regulations (i.e. 10CFR50 appendix A). Design criterion #26 states: "Two independent reactivity control systems of different design principles shall be provided. One of the systems shall use control rods, preferably including a positive means for inserting the rods, and shall be capable of reliably controlling reactivity changes to assure that under conditions of normal operation, including anticipated operational occurrences, and with appropriate margin for malfunctions such as stuck rods, specified acceptable fuel design limits are not exceeded. The second reactivity control system shall be capable of reliably controlling the rate of reactivity changes resulting from planned, normal power changes (including xenon burnout) to assure acceptable fuel design limits are not exceeded. One of the systems shall be capable of holding the reactor core subcritical under cold conditions."

Previous designs all complied with the requirement to provide a rod control system. Boiling Water Reactor (BWR) used a separate reactor core flow control which effectively manipulated the moderator (i.e. coolant properties) through the core. Pressurized Water Reactor (PWR) designs used a mixture of boron within the primary coolant which also effected how the moderator could control the nuclear chain reactions within the core. Beyond these two types of manipulation of the water within the core of a reactor, there was no other way to sufficiently provide separate control through all the range of power levels expected by the NRC. The invention claimed here solves this problem.

This invention changes the core geometry in order to positively control the nuclear reaction and is potentially applicable to all known types of reactors, even light water reactors (LWR). The ability to provide a control system based on the movable geometry of the reactor allows for a separate and distinct reactor control system. This control system provides an ability to change the core geometry to increase or decrease, as necessary, the neutron coupling within the core. In the case of light water reactors, this would be a moderating and reflecting property. In the case of fast neutron reactors, this would be mostly the reflecting properties to maintain the core neutron inventory.

The claimed invention differs from what currently exists. This adds to the safety of the reactor. Thus creating a safer reactor by orders of magnitude higher than what exists today. The core can be shut down by control rods (neutron absorption) in the core and also by removing the necessary core geometry for moderation and reflection of those neutrons into the core in order to be able to sustain the nuclear reaction through this invention. This limitation of core geometry also helps limit the consequences of a rod withdrawal accident thus also increasing reactor safety.

This invention is an improvement on what currently exists. This adds to the safety of the reactor. Thus creating a safer reactor by orders of magnitude higher than what exists today. The core can be shut down by control rods (neutron absorption) in the core and also by removing the necessary core geometry for moderation and reflection of those neutrons into the core in order to be able to sustain the nuclear reaction through this invention. This limitation of core geometry also helps limit the consequences of a rod withdrawal accident thus also increasing reactor safety.

The previous method of changing the properties of the moderator can only be applied to very specific light water reactor designs. Other types of reactors such as a high temperature gas cooled reactor (HTGR), Liquid sodium fast breeder reactor (FBR), or liquid fluoride thorium reactor (LFTR) cannot use water as cooling and therefore cannot use either previous method. Liquid salt and liquid metal type reactors also do not use water as a moderator/reflector and therefore cannot use any systems that change the properties of water.

This reactor control system can be applied to all types of reactors regardless of design. This design for reactor control is used in addition to the necessary rod control system in accordance with the 10CFR50 design criteria. This allows for the requirements of the NRC to be met along with the ability for dual control on power control of any type reactor regardless of process output from the secondary plants.

The Version of the Invention Discussed Here Includes:
  A. Carriage Brace
  B. Suspension rods
  C. Vertical gearing rod
  D. Vertical gearing rod motor (provides vertical movement)
  E. Center gearing
  F. Carriage brace motor (provides horizontal movement)
  G. Neutron detection system input
  H. Control logic for movement
  I. Neutron reflector/moderator blocks
  J. Suspension rod brace (downward mechanical stops)
  K. Release locks'

Relationship Between the Components:

The RM blocks are suspended from the carriage brace by the suspension rods. The carriage brace is connected together (two separate halves) through the center gearing. The RM blocks are positioned with the vertical gearing rod through the center of the block and connected to the suspension carriage. The center gearing provides a stationary center point of the whole structure. The carriage brace motor is attached to the gear teeth of the carriage brace. Suspension rod braces are attached to the rods underneath the RM blocks. Release locks are located on the vertical gearing rods at the top of the RM blocks. These are electrically controlled by the control logic system associated with the RM control. Neutron system input is delivered into the RM control system to provide trip set points.

How the Invention Works:

The RM blocks from the geometry for the core to be neutronically coupled for the nuclear chain reaction to work. The RM blocks are suspended on the suspension rods at core height. These provide vertical and horizontal stability to the blocks. The vertical gearing rods are in the center of the blocks and allow for vertical positioning of the blocks. The carriage braces are connected together by center gears much like an expandable kitchen table arrangement. The opposite sides of the brace are arranged next to the center gear. When one side of the brace is moved, this turns the fixed center gear which then moves the opposite side of the carriage brace. Since the RM blocks are suspended from this carriage, the blocks can move towards or away from the reactor core. When the appropriate distance is reached, the core is then geometrically configured to allow the neutron chain reaction to be sustained.

The core power detectors are connected to the control system for the purpose of control. There is also a trip set point that can be reached which could be coupled to the existing high power/oscillating power set points. The result of actuating one of these power tripping points would activate the latch release mechanisms of the RM blocks. The blocks would slide down and out of the way. There would also be a separate mechanism that would withdraw the RM carriage to the most open position (i.e. the RM block are moved outward away from the reactor vessel as far as carriage allows. The RM blocks are stopped by the suspension rod braces that do not allow the RM blocks to fall the whole way to the bottom of the core. Were the core to ever reach a molten state (in the case of a LWR) or already be in a molten state (such as a LFTR), then the corium would find its way to the bottom of the reactor (or separate holding tank in the case of the LFTR) well past the bottom of the RM blocks thus ensuring that the function of providing neutron coupling is not still supplied to the core in that condition. This principle works well with a pool type liquid sodium reactor as well. Since the carriage and all electrical components sit up at the carriage which would be suspended over the pool, the RM blocks could be moved back and forth within the pool with ease. Since they are already suspended on movable carriages with the ability to pull them up and down, it would be easy to pull them to the surface of the pool and then remotely attach a lifting device to them for removal from the pool.

The general control of the blocks will be through manual controllers. The trip logic controls the block drop and withdrawal function for the system. IF the input from the neutron instrumentation reaches the trip set point, THEN the logic will unlatch the RM blocks and allow them to fall to the lowest position on the cable while simultaneously backing the carriages away from the core. The upward movement of the RM blocks is controlled manually.

How to Make the Invention:

The invention is made and assembled in accordance with the description above. The RM blocks are made of the most appropriate reflective material with moderation properties. This is usually a form of carbon block. Suspended tanks of water or concrete can prove difficult to manage from a material property and weight perspective. The blocks are suspended from the carriage after the carriage is installed. Control system logic is connected to the motors that control the upward/downward motion of the RM block and also the inward/outward motion of the control carriage. Power instrumentation for the reactor is than input into the control system. Logic is constructed so that the protective actions are actuated should the set points be reached.

The system components are necessary. Elements that could be added might include a neutron absorption shield that might fall in front of the RM blocks to even more quickly absorb the core neutrons. This function is normally considered the function of the control rod system's function. Duplication of this function might add a marginal amount of safety but could turn out to be cost prohibitive in relation to the rod control system. The ability to remove the core's neutron coupling provides a completely separate and distinct method for control of reactor power.

The blocks could be made into petals like a flower and radially drop back out of the way to remove them from service. The RM blocks could be shaped in a configuration like the iris of a camera and then rotated out of the way much like opening that iris in order to remove their coupling function. In the case of pool type reactors, the use of RM rods or correctly configured rods could be used interspersed with the poison control rods.

How to Use the Invention:

The core needs to be controlled through the establishment of the correct geometry and the removal of the control rods in order to allow the reactors chain reaction to occur. This could be done with the establishment of the correct geometry first and then the withdrawal of the control rods. Once the section of the core that has the RM blocks surrounding it is used up the blocks are moved vertically upward (in the case of the movable blocks) or the core is finished just as conventional cores are today. Since this is an alternate method of control, it is possible to establish a certain rod line (i.e. control rods are withdrawn to a certain level) and then the RM blocks are moved into position horizontally toward the core to provide coupling. As more coupling is desired, the blocks can move even closer to the outer wall of the reactor vessel (or in the case of the liquid pool types, simply closer to the fuel arrangement).

By using RM blocks that only convert a certain segment of the core to a usable geometry, the severity of a rod withdrawal accident is greatly reduced. The portion of the core that could produce power is limited to the length of the RM block. This design could significantly reduce the impact or any rod withdrawal accident while also providing a methodology of removing the blocks from the affected part of the core in order to contain this accident by an even greater degree.

The reactor is monitored and controlled with the same overall set points for safety as before, however, now there are two distinct systems that can control reactor power and can instantaneously shutdown the reactor.

The same power level instrumentation is used as an input into the rod control system as for this new reactor control system. This ensures that there is no possibility for offset values to trip the rod control system or the new reactor control system inadvertently. The trip system relies on gravity to perform most of the function of removing the RM blocks from the power production area of the core. Most of the maintenance and repair of this system can be done without ever opening the reactor vessel. This ensures that operational problems are more easily accomplished. This leads to a higher reliability for this system which also helps to lower the overall risks of operation.

This type of system allows for more fuel to be loaded in the reactor core with only a certain segment being covered by the length of the RM blocks. As the core ages and the bottom fuel is used, the RM blocks could be raised through the vertical positioning rods and thereby activating fuel higher up with the fuel rod assemblies. This would allow the core to operate for a longer period between refueling outages. By using this positioning method outages could be theoretically changed from 1.5-2 years out to 4-5 years. Thus this could significantly increase the revenue generation of the plant. In the cases with liquid type fuels or ball type fuels that can be refueled through a feed-and-bleed method, this would have no effect whatsoever.

What is claimed is:

1. A system comprising:
    a nuclear reactor reactivity control system, the nuclear reactor reactivity control system constructed to:
        control a rate of reactivity change resulting from power changes through all ranges of power levels as required by NRC regulations in effect on Nov. 1, 2015; and
        hold a core of a nuclear reactor controllable by the nuclear reactor reactivity control system in a sub-critical state under cold conditions solely via movement of a single pair of blocks neutron reflector/moderator blocks; and
    wherein, the nuclear reactor reactivity control system comprises the single pair of neutron reflector/moderator blocks, the pair of neutron reflector/moderator blocks external to and partially surrounding the nuclear reactor, each of the pair of neutron reflector/moderator blocks comprising neutron reflective material with moderation properties.

2. The system of claim 1, further comprising:
the nuclear reactor.

3. The system of claim 1, further comprising:
a reactor containment structure that substantially surrounds the nuclear reactor.

4. The system of claim 1, further comprising:
a core power detector coupled to a control system of the nuclear reactor, the control system constructed to, responsive to a signal from the core power detector, move the pair of neutron reflector/moderator blocks relative to an activated portion of the core of the nuclear reactor.

5. The system of claim 1, wherein:
the pair of neutron reflector/moderator blocks is, via at least one motor, movable both vertically and horizontally relative to a core of the nuclear reactor.

6. The system of claim 1, wherein:
suspension rod braces limit movement of the pair of neutron reflector/moderator blocks relative to a core of the nuclear reactor.

7. The system of claim 1, wherein:
the pair of neutron reflector/moderator blocks comprises carbon black.

8. The system of claim 1, wherein:
a position of the pair of neutron reflector/moderator blocks relative to a core of the nuclear reactor is manually controllable.

9. The system of claim 1, wherein:
the pair of neutron reflector/moderator blocks is coupled to a vertical gearing rod, the vertical gearing rod, via a vertical gearing rod motor, constructed to move the pair of neutron reflector/moderator blocks vertically relative to the nuclear reactor.

10. The system of claim 1, wherein:
the pair of neutron reflector/moderator blocks is coupled to a carriage, the carriage, via a carriage brace motor, constructed to cause the pair of neutron reflector/moderator blocks to reduce neutron reflection relative to the nuclear reactor by laterally traversing the pair of neutron reflector/moderator blocks.

11. The system of claim 1, wherein:
the pair of neutron reflector/moderator blocks is coupled to a carriage, the carriage, via a carriage brace motor, constructed to cause the pair of neutron reflector/moderator blocks move away from the nuclear reactor.

12. The system of claim 1, wherein:
the pair of neutron reflector/moderator blocks is suspended from a carriage brace by suspension rods, the carriage brace comprising two separate halves that are coupled together via center gearing, the pair of neutron reflector/moderator blocks positioned with a vertical gearing rod substantially through a center of each block and coupled to a suspension carriage, the suspension carriage engaged with the carriage brace, a carriage brace motor causing teeth of the carriage brace to move the carriage and thereby move the pair of neutron reflector/moderator blocks relative to a core of the nuclear reactor.

13. The system of claim 1, wherein:
the pair of neutron reflector/moderator blocks is electrically controlled by a control logic system of the nuclear reactor.

14. The system of claim 1, wherein:
the pair of neutron reflector/moderator blocks are suspended on suspension rods at core height of the nuclear reactor.

15. The system of claim 1, wherein:
vertical gearing rods are substantially in the center of the pair of neutron reflector/moderator blocks and allow for vertical positioning of the pair of neutron reflector/moderator blocks.

16. The system of claim 1, wherein:
the pair of neutron reflector/moderator blocks comprises petals like a flower.

17. The system of claim 1, wherein:
the pair of neutron reflector/moderator blocks shaped in a configuration like an iris of a camera.

18. The system of claim 1, wherein:
a shutdown feature of the nuclear reactor reactivity control system uses a separation of release locks to a vertical gearing rod, which allows the pair of neutron reflector/moderator blocks to drop down and away from the core to cause a shutdown condition for the core due to the removal of the pair of neutron reflector/moderator blocks, which increases fast and thermal neutron leakage from the core such that the core is no longer coupled neutronically and is shutdown.

* * * * *